(12) United States Patent
Al-Harthi et al.

(10) Patent No.: US 9,783,651 B1
(45) Date of Patent: *Oct. 10, 2017

(54) OLEFIN POLYMERIZATION METHOD USING BARIUM FERRITE-CONTAINING CATALYST NANOPARTICLES

(71) Applicant: KING FAHD UNIVERSITY OF PETROLEUM AND MINERALS, Dhahran (SA)

(72) Inventors: Mamdouh Ahmad Al-Harthi, Dhahran (SA); Farrukh Shehzad, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,776

(22) Filed: Jun. 20, 2017

Related U.S. Application Data

(63) Continuation of application No. 14/796,721, filed on Jul. 10, 2015, now Pat. No. 9,718,942.

(51) Int. Cl.
*C08F 2/44* (2006.01)
*C08K 3/24* (2006.01)
*C08K 3/08* (2006.01)
*C08K 9/02* (2006.01)
*C08F 210/02* (2006.01)

(52) U.S. Cl.
CPC ............... *C08K 3/24* (2013.01); *C08K 3/08* (2013.01); *C08K 9/02* (2013.01); *C08F 210/02* (2013.01); *C08K 2003/0856* (2013.01); *C08K 2201/011* (2013.01)

(58) Field of Classification Search
CPC ........... C08F 210/02; C08K 9/02; C08K 3/08; C08K 3/16; C08K 2003/0812; C08K 2003/0856; C08K 2003/2206; C08K 2003/2265
USPC ....................................................... 524/785
See application file for complete search history.

(56) References Cited

U.S. PATENT DOCUMENTS

| | | |
|---|---|---|
| 5,608,009 A | 3/1997 | Machida |
| 5,739,225 A | 4/1998 | Tazaki |
| 5,955,557 A | 9/1999 | Machida |
| 6,649,713 B2 | 11/2003 | Tang et al. |

(Continued)

FOREIGN PATENT DOCUMENTS

EP 0 374 619 A1 6/1990

OTHER PUBLICATIONS

Zapata, P., et al., "Polypropylene Nanocomposites Obtained by In Situ Polymerization Using Metallocene Catalyst: Influence of the Nanoparticles on the Final Polymer Morphology", Journal of Nanomaterials, vol. 2012, Article ID 194543, pp. 1-6, (Feb. 2012).

(Continued)

*Primary Examiner* — Jane L Stanley
(74) *Attorney, Agent, or Firm* — Oblon, McClelland, Maier & Neustadt, L.L.P.

(57) ABSTRACT

A method involving polymerizing ethylene in the presence of a catalyst composition containing $BaFe_{12}O_{19}$ nanoparticles, a zirconocene catalyst, and an alkylaluminoxane co-catalyst. A nanocomposite is formed by the polymerization, whereby the $BaFe_{12}O_{19}$ nanoparticles are dispersed in a matrix of polyethylene (PE), and the % crystallinity is lowered. The activity of the catalyst is increased in the presence of the $BaFe_{12}O_{19}$ nanoparticles.

13 Claims, 2 Drawing Sheets

(56) References Cited

U.S. PATENT DOCUMENTS

2009/0171042 A1 7/2009 Denifl
2009/0302263 A1 12/2009 Dhawan
2013/0317170 A1 11/2013 Marks
2017/0009049 A1 1/2017 Al-Harthi

OTHER PUBLICATIONS

Dos Santos, J.H.Z., et al., "Comparative Study of (nBuCp)2ZrCl2 Performance in Ethylene Polymerization: Homogeneous and Supported Catalysts", Azojomo, vol. 2, ISSN 1833-122X, pp. 1-11, (Mar. 2006).

OLEFIN POLYMERIZATION METHOD USING BARIUM FERRITE-CONTAINING CATALYST NANOPARTICLES

CROSS-REFERENCE TO RELATED APPLICATIONS

The present application is a continuation of Ser. No. 14/796,721, now allowed, having a filing date of Jul. 10, 2015.

BACKGROUND OF THE INVENTION

Technical Field

The present invention relates to a method of polymerizing ethylene in the presence of a catalyst composition containing $BaFe_{12}O_{19}$ nanofiller, a metallocene catalyst, and an alkylaluminoxane co-catalyst. The disclosure further includes a catalytic composition that includes a metallocene, a barium ferrite nanofiller and an alkylaluminoxane co-catalyst. Furthermore, the effect of the barium ferrite nanofiller on the catalytic activity of the metallocene polymerization catalyst and the properties of the resulting polyethylene/barium ferrite nanocomposite are disclosed.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The field of olefin polymerization catalysis has accelerated in recent years, leading to the production of polymers with specific characteristics and many practical applications [W. Kaminsky, Macromol. Chem. Phys. 209 (2008) 459; V. C. Gibson, S. K. Spitzmesser, Chem. Rev. 103 (2003) 283—each incorporated herein by reference in its entirety]. Among olefin polymerization catalysts, metallocene complexes have proven to be some of the most versatile catalysts, while also providing high levels of polymer structure control [S. H. Abdul Kaleel, B. Kottukkal Bahuleyan, S. K. De, M. Jabarulla Khan, R. Sougrat, M. A. Al-Harthi, J. Ind. Eng. Chem. 18 (2012) 1836—incorporated herein by reference in its entirety]. For example catalytic activity, molar mass and molar mass distribution can be tuned by changes in the ligand and the metal center [V. C. Gibson, S. K. Spitzmesser, Chem. Rev. 103 (2003) 283; T. U. Berlin, F. V. Berlin, 501 (1995) 219—each incorporated herein by reference in its entirety]. Similarly, the steric and electronic effects of metallocene complexes can be tuned by altering the substitution patterns around the two aromatic ligands [H. G. Alt, a Köppl, Chem. Rev. 100 (2000) 1205—incorporated herein by reference in its entirety]. Recently, research efforts have shifted towards the use of nanomaterials to enhance the catalytic activity of metallocene complexes and to improve the properties of the resulting polymers. One such strategy to improve polymer properties involves an in-situ polymerization method, which results in better dispersion of nanofiller throughout the polymer matrix. In-situ polymerization also provides new scientific knowledge about the effect of nanofiller on the activity and chemistry of polymerization catalysts [E. Chaichana, B. Jongsomjit, P. Praserthdam, Chem. Eng. Sci. 62 (2007) 899—incorporated herein by reference in its entirety]. For instance the steric effect of graphene and CNTs can be utilized to tune the molecular weight, MWD and catalytic activity of single site catalysts [M. Stürzel, F. Kempe, Y. Thomann, S. Mark, M. Enders, R. Mülhaupt, Macromolecules 45 (2012) 6878; S. Park, S. W. Yoon, K.-B. Lee, D. J. Kim, Y. H. Jung, Y. Do, H. Paik, I. S. Choi, Macromol. Rapid Commun. 27 (2006) 47—each incorporated herein by reference in its entirety]. Studies on the effect of nano-Titania ($TiO_2$) have shown that anatase $TiO_2$ enhances the catalytic activity of MAO/Zirconocene (Zr) complex while rutile $TiO_2$ has a detrimental effect [W. Owpradit, B. Jongsomjit, Mater. Chem. Phys. 112 (2008) 954—incorporated herein by reference in its entirety]. Kaleel et al. reported that an optimum amount of Manganese (Mn) doped $TiO_2$ and organically modified montmorillonite increased activity of MAO/Zr catalyst [S. H. Abdul Kaleel, B. Kottukkal Bahuleyan, S. K. De, M. Jabarulla Khan, R. Sougrat, M. a. Al-Harthi, J. Ind. Eng. Chem. 18 (2012) 1836; G. Leone, F. Bertini, M. Canetti, L. Boggioni, P. Stagnaro, I. Tritto, (2008) 5390—each incorporated herein by reference in its entirety]. Similarly, nano-silica ($SiO_2$), nano-zinc oxide (ZnO), and nano-Zirconia ($ZrO_2$) also enhanced the activity of MAO/Zr catalyst for ethylene/α-olefin polymerization [E. Chaichana, B. Jongsomjit, P. Praserthdam, Chem. Eng. Sci. 62 (2007) 899; E. Chaichana, A. Ngowthanawat, O. Mekasuwandumrong, J. Panpranot, A. Shotipruk, B. Jongsomjit, Iran. Polym. J. 21 (2011) 51; N. M. Ushakov, G. Y. Yurkov, L. V. Gorobinskii, O. V. Popkov, I. D. Kosobudskii, Acta Mater. 56 (2008) 2336; T. Pothirat, B. Jongsomjit, P. Praserthdam, Catal. Commun. 9 (2008) 1426—each incorporated herein by reference in its entirety].

In view of the forgoing, one object of the present disclosure is to provide a catalyst composition having improved catalyst performance and to demonstrate the effect of a barium ferrite nanofiller on the catalytic activity of a metallocene/zirconocene ethylene polymerization catalyst and further a process to synthesize a polyethylene/$BaFe_{12}O_{19}$ nanocomposite polymer using an in-situ polymerization method.

BRIEF SUMMARY OF THE INVENTION

According to a first aspect, the present disclosure relates to a method of polymerizing ethylene in the presence of a catalyst composition containing $BaFe_{12}O_{19}$ nanoparticles, a metallocene catalyst, and an alkylaluminoxane co-catalyst. The polymerization method forms a nanocomposite in which the $BaFe_{12}O_{19}$ nanoparticles are dispersed in a matrix of polyethylene (PE).

In one embodiment, the metallocene catalyst is a zirconocene catalyst such as zirconocene dichloride.

In one embodiment, the polymerizing is carried out in a liquid solvent.

In a preferred embodiment, the liquid solvent is a hydrocarbon solvent.

In one embodiment, the alkylaluminoxane co-catalyst is methylaluminoxane.

In one embodiment, the $BaFe_{12}O_{19}$ nanoparticles have a largest diameter of 1-100 nm.

In one embodiment, the preparation of the catalyst composition includes (i) first mixing the metallocene catalyst and the alkylaluminoxane co-catalyst with the ethylene, (ii) then adding the $BaFe_{12}O_{19}$ nanoparticles to the mixture.

In one embodiment, a weight ratio of $BaFe_{12}O_{19}$ nanoparticles to the zirconocene catalyst is 0.5:1 to 1:1, and the catalyst composition has a catalyst activity of $300\text{-}350\times10^{-3}$ $KgPE\cdot mol^{-1}\cdot h^{-1}\cdot bar^{-1}$.

In one embodiment, a weight ratio of $BaFe_{12}O_{19}$ nanoparticles to the zirconocene catalyst is 1.5:1 to 2:1, and the catalyst composition has a catalyst activity of $350$-$370 \times 10^{-3}$ $KgPE \cdot mol^{-1} \cdot h^{-1} \cdot bar^{-1}$.

In one embodiment, a weight ratio of $BaFe_{12}O_{19}$ nanoparticles to the zirconocene catalyst is 2.5:1 to 3:1, and the catalyst composition has a catalyst activity of $280$-$300 \times 10^{-3}$ $KgPE \cdot mol^{-1} \cdot h^{-1} \cdot bar^{-1}$.

In one embodiment, the nanocomposite comprises 0.01-1.0 wt % of the $BaFe_{12}O_{19}$ nanoparticles.

In one embodiment, the nanocomposite has a crystalline melting temperature of 133.3-134.0° C.

In one embodiment, the nanocomposite has a % crystallinity of 63-73.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
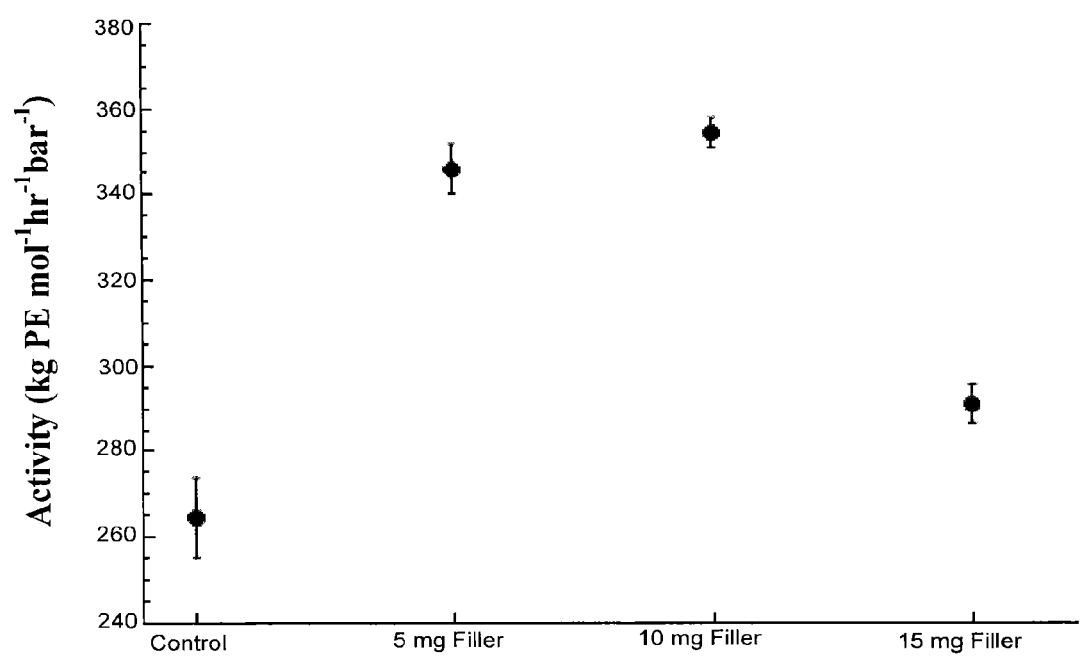
FIG. 1 is a graph illustrating the activity of the catalyst composition at different loadings of $BaFe_{12}O_{19}$ nanofiller.

Referring now to the drawings.

The present invention relates to i) a method of polymerizing ethylene in the presence of a catalyst composition containing $BaFe_{12}O_{19}$ nanofiller, a metallocene catalyst, and an alkylaluminoxane co-catalyst, ii) a catalyst composition containing $BaFe_{12}O_{19}$ nanofiller, a metallocene catalyst, and an alkylaluminoxane co-catalyst, and iii) the effect of the barium ferrite nanofiller on the activity of the zirconocene polymerization catalyst and the properties of the resulting polyethylene/barium ferrite nanocomposite.

According to a first aspect, the present disclosure relates to a method of polymerizing ethylene in the presence of a catalyst composition containing $BaFe_{12}O_{19}$ nanoparticles, a zirconocene catalyst, and an alkylaluminoxane co-catalyst.

A nanocomposite is a multiphase solid material where one of the phases has one, two or three dimensions of less than 100 nanometers, or structures having nano-scale repeat distances between the different phases that make up the material. In the broadest sense this definition can include porous media, colloids, gels and copolymers, but is more usually taken to mean the solid combination of a bulk matrix and a nano-dimensional phase differing in properties due to dissimilarities in structure and chemistry. In general, the mechanical, electrical, thermal, optical, electrochemical, catalytic properties of the nanocomposite will differ from that of the component materials.

Fillers are particles added to materials, such as plastics, to engender superior properties of the mixed material. Further, fillers may affect the process by which a material or mixed material is processed, making production more efficient or more facile. In terms of the present disclosure the term "nanofiller" refers to added materials with at least one dimension of less than 100 nm that change the properties of the material to which they are added, or affect the process by which the mixed material is produced or manufactured.

In one embodiment, the nanofiller is a magnetic nanofiller. A magnetic nanofiller refers to any nanometer sized material that is, or contains at least one material that is, ferromagnetic.

In one embodiment, the nanofiller is a mixed-metal nanofiller. In one embodiment, the mixed metal nanofiller of the present disclosure is $BaFe_{12}O_{19}$. Barium ferrite is a chemical compound that has been used as a component of magnetic stripe cards and subwoofer magnets. Barium ferrite is a highly magnetic material with a high packing density. In addition to $BaFe_{12}O_{19}$, other barium ferrite family members may be used in the present method, including, but not limited to $BaFe_2O_4$, $BaFe_{15}O_{23}$ and $BaFe_{18}O_{27}$.

In one embodiment, the $BaFe_{12}O_{19}$ nanoparticles have a largest diameter of 1-100, preferably 25-100, more preferably 50-100, even more preferably 75-100 nm.

In one embodiment, the nanofiller may be of any shape that provides desired polymerization activity and properties of the resulting polymer/nanofiller nanocomposite. The nanofiller may be a nanometer ballshape in all three dimensions such as nanometer granules, or a nanometer size in two dimensions such as whiskers, and nanometer size sheet structure such as layered metal compounds. In addition to granules, whiskers, and sheets, the nanofiller may take on other various forms, such as a powder, a flake, a foil, and a fiber.

As used herein, a catalyst is a substance that can cause a change in the rate of a chemical reaction without itself being consumed in the reaction. Catalysts are generally characterized as either heterogeneous or homogeneous.

Ziegler-Natta polymerization catalysts are used in the synthesis of olefin-based polymers, through the polymerization of terminal alkenes, or olefins. Exemplary olefins used as starting materials for Ziegler-Natta polymerizations include, but are not limited to, ethylene, propylene, and n-butylene. Two broad classes of Ziegler-Natta catalysts are employed, distinguished by their solubility, which include heterogeneous supported catalysts and homogeneous catalysts. Homogeneous catalysts are usually based on complexes of Ti, Zr or Hf, and are often employed in combination with an organoaluminum co-catalyst, methylaluminoxane (or methylalumoxane, MAO). These catalysts traditionally include metallocenes but may also feature multidentate oxygen- and nitrogen-based ligands. The combination of metallocene catalyst and organoaluminum co-catalysts renders these catalyst mixtures soluble in a wide array of common organic solvents, hence their classification as homogeneous catalysts.

Metallocenes are a type of sandwich compound, an organometallic complex featuring a metal bound by haptic covalent bonds to two arene ligands. A metallocene is a compound typically consisting of two substituted or unsubstituted cyclopentadienyl anions (Cp, which is $C_5H_5^-$) bound to a metal center (M) in the oxidation state II or IV, with the resulting general formula $(C_5H_5)_2M$ or $(C_5H_5)_2MX_2$, e.g., titanocene dichloride, vanadocene dichloride. When the metal of the metallocene is zirconium, the complex is then referred to as zirconocene.

In the present disclosure, the zirconocene catalyst refers to the general formula 1

$$(cp)_2ZrR^1R^2 \quad (1)$$

wherein cp represents an optionally substituted cyclopentadienyl group, and $R^1$ and $R^2$ are each an optionally substituted alkyl group, a cyclopentadienyl group, a halogen atom, or a hydrogen atom.

As referred to herein, the term "substituted" means that at least one hydrogen atom is replaced with a non-hydrogen group, provided that normal valencies are maintained and that the substitution results in a stable compound.

Exemplary cp groups include, but are not limited to cyclopentadienyl, pentamethylcyclopentadienyl, and 1,2-diphenyl cyclopentadienyl. Further, the metallocene or zirconocene catalyst may refer to several classification types, including parallel, multi-decker, bridged (e.g. ansa-bridged), half-sandwich, and bent complexes. The zirconocene catalyst of the present method may also include more than two cp groups.

In one embodiment, the zirconocene catalyst is zirconocene dichloride. In one embodiment, the zirconocene catalyst is dimethyldicyclopentadienyl zirconium.

While most Ziegler-Natta catalysts contain a metallocene complex, it is envisaged that the present method may be adapted to the use of non-metallocene polymerization catalysts. Such catalysts may be comprised of a variety of complexes of various metals, such as scandium, lanthanoid, and actinoid metals, and a wide variety of ligands containing oxygen, nitrogen, phosphorous, and sulfur. Any metal and ligand combination may be used as the catalyst in the present method, so long as it provides the desired catalytic activity and resulting nanocomposite properties.

The metallocene catalyst in a Ziegler-Natta polymerization reaction such as zirconocene dichloride may be accurately referred to as a pre-catalyst, since the dichloride structure is not responsible for the catalytic polymerization. Instead, the zirconocene dichloride converts to the active catalyst in-situ after reaction with a co-catalyst. A co-catalyst is a chemical species that is required to act upon a catalyst for reaction to occur, or that improves the catalytic activity of a catalyst by acting as a promoter in a cooperative catalytic process. In the Ziegler-Natta reaction, alkylaluminum compounds are commonly used as a co-catalyst. In the present method, the alkylaluminum co-catalyst performs a ligand exchange reaction when reacting with the metallocene catalyst, ultimately forming a cationic metal species that catalyzes the olefin polymerization reaction.

Alkylaluminoxanes are compounds prepared from the hydrolysis of alkylaluminum species. Alkylaluminoxanes, such as methylaluminoxane (MAO) are commonly used as a co-catalyst in Ziegler-Natta polymerizations.

In one embodiment, the alkylaluminoxane co-catalyst is methylaluminoxane.

In addition to alkylaluminoxanes, the present method may be adopted for use with other co-catalysts. Representative co-catalysts include, trialkylaluminum compounds such as trimethylaluminum, triethylaluminum, triisopropylaluminum, triisobutylaluminum, and trioctylaluminum, dialkylaluminum monohalides such as diethylaluminum monochloride, diethylaluminum monobromide, diethylaluminum monoiodide, diisopropylaluminum monochloride, diisobutylaluminum monochloride, and dioctylaluminum monochloride, alkylaluminum sesquihalides such as methylaluminum sesquichloride, ethylaluminum sesquichloride, ethylaluminum sesquibromide, and butylaluminum sesquichloride, and their mixtures.

As alkylaluminoxanes are compounds prepared from the hydrolysis of alkylaluminum species, other exemplary alkylaluminoxanes that may be used as a co-catalyst in the present method include the hydrolysis products from the other representative co-catalysts mentioned previously.

In addition to Ziegler-Natta polymerization, it is envisaged that the present method may be adapted to include other types of polymerization processes, by altering catalysts, starting materials, and other reactants. Briefly, the other polymerization types include, but are not limited to, cationic polymerization, anionic polymerization, group transfer polymerization, reactions with supported metal oxide catalysts, alfin polymerization, living polymerization, ring-opening polymerization, and metathesis polymerization. Catalysts, additives, and starting materials of the alternative polymerization processes are known to those of ordinary skill.

Polymeric materials using layered metal compounds as a nanometer component can be obtained by the "in-situ polymerization" method. In this method, the olefin monomer or catalyst is adsorbed in the gaps of the nanofiller compound and then is polymerized in said gaps. As a result, the inorganic nanofiller component is homogeneously dispersed in the polymer matrix. In one embodiment, the metallocene catalyst may enter the gaps in the nanofiller, resulting in increased gap sizes, which then enables the ethylene monomer to diffuse freely into the gaps to contact with the metal ions of the catalyst centers. In one embodiment, the olefin monomer may enter the gaps in the nanofiller, resulting in increased gap sizes, which then enables the metallocene catalyst to diffuse freely into the gaps to contact olefin monomers for the polymerization reaction. Further, a large amount of heat generated in the polymerization helps the nanofiller particles to disperse homogeneously in the polyolefin matrix.

In one embodiment, the polymerization method forms a nanocomposite in which the $BaFe_{12}O_{19}$ nanoparticles are dispersed in a matrix of polyethylene (PE).

Polyethylene (PE) is the most common type of plastic and is primarily used in packaging (plastic bag, plastic films, geomembranes, containers including bottles, etc.). Many kinds of polyethylene are known, having the chemical formula $(C_2H_4)_nH_2$. Thus PE is usually a mixture of similar organic compounds that differ in terms of the value of n.

Polyethylene is classified into several different categories based mostly on its density and branching. Its mechanical properties depend significantly on variables such as the extent and type of branching, the crystal structure and the molecular weight. In the present invention, exemplary PE classes include, ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE), low-density polyethylene (LDPE), very-low-density polyethylene (VLDPE), and chlorinated polyethylene (CPE).

In one embodiment, the polymer matrix is a high-density polyethylene (HDPE) matrix.

In addition to ethylene polymerization to form polyethylene, other types of olefins starting materials may be used in the present method to generate polymers of the nanocomposite including, but not limited to, polystyrene, polyvinyl chloride, polyvinylidene chloride (PVDC), polypropylene (PP), high impact polystyrene (HIPS), acrylonitrile butadiene styrene (ABS), polyethylene/Acrylonitrile butadiene styrene (PE/ABS), and polycarbonate/acrylonitrile butadiene styrene (PC/ABS). Further, depending on the olefin starting material, the method of the present invention may generate a nanocomposite in which the $BaFe_{12}O_{19}$ nanoparticles are dispersed in a matrix of polyethylene, polypropylene, copolymers of ethylene and 1-alkenes, polybutene-1, polymethylpentene, polycycloolefins, polybutadiene, polyisoprene, amorphous poly-alpha-olefins (APAO), polyacetylene, and mixtures thereof. Other polymers that may be prepared by the present method and Ziegler-Natta catalysis are recognized by those of ordinary skill in the art.

In one embodiment, the polymerizing is carried out in a liquid solvent.

Liquid solvents may include aprotic polar solvents, polar protic solvents, and non-polar solvents. Suitable aprotic polar solvents may include, but are not limited to, propylene carbonate, ethylene carbonate, butyrolactone, acetonitrile, benzonitrile, nitromethane, acetonitrile, nitrobenzene, sulfolane, dimethylformamide, N-methylpyrrolidone, or the like. Suitable polar protic solvents may include, but are not limited to, water, nitromethane, and short chain alcohols. Suitable short chain alcohols may include, but are not limited to, one or more of methanol, ethanol, propanol, isopropanol, butanol, or the like. Suitable non-polar solvents may include, but are not limited to, cyclohexane, octane, heptane, hexane, benzene, toluene, xylene, methylene chloride, carbon tetrachloride, or diethyl ether. Co-solvents may also be used. In a preferred embodiment, the liquid solvent is a hydrocarbon solvent.

In a preferred embodiment, the hydrocarbon solvent is toluene.

The catalyst composition of the present disclosure may further include an additive, in addition to the nanofiller. Representative examples of such additives include metals, metal oxides, metal carbonates, carbonaceous substances, various ceramics, organic pigments, Lewis bases, and plasticizers. In addition, solid foaming agents can be used. The metals may include aluminum, nickel, zinc, molybdenum, iron, and tin. The metal oxides may include alumina, titania, zirconia, silica, iron oxide, and also silica-alumina, mica, and ferrite. The metal carbonates may include calcium carbonate, potassium carbonate, sodium carbonate, and barium carbonate. The carbonaceous substances may include carbon black (e.g., furnace black and Ketjen black), graphite, active carbon, carbon nanotubes, carbon nanorods, and carbon fibers. Representative examples of ceramics include carbides such as silicon carbide (SiC), chromium carbide (Cr3 C2), titanium carbide (TiC), zirconium carbide (ZrC), boron carbide (B4-C), and diamond (C), nitrides such as silicon nitrides (SiN), SbN, $SbN_3$, and $Si_3N_4$), boron nitride (BN), zirconium nitride (ZrN), niobium nitride (NbN), and titanium nitride (TiN), borides such as titanium boride (TiB), zirconium boride (ZrB), tantalum boride (TaB), vanadium boride (VB2), and lanthanum boride (LaB6), and silicides such as titanium silicide (TiSi), tantalum silicide (TaSi), molybdenum silicide (MoSi), and tungsten silicide (WSi2). The type of the additive to be used can be determined appropriately depending on the purpose for which the ultimate polyethylene composition is used. When the polyethylene composition is used as an abrasion-resistant material or heat-releasing material, for example, silicon carbides may be used. When it is used as an insulating material, boron nitrides and silicon nitrides may be used. When it is used as a neutron-blocking material, boron nitrides, for example, may be used. These additives e.g., metals, metal oxides, metal carbonates, carbonaceous substances, ceramics, glass fibers, glass beads, glass balloons, mica, potassium titanate, and pulp, can be used without application of any treatment.

In addition, the additive may be an organic pigment. The type of the organic pigment is determined appropriately depending on the desired color in which the ultimate polyethylene composition is colored. Representative examples of such organic pigments include water-insoluble azo-, water-soluble azo-, phthalocyanine-, anthraquinone-, thloindigoid-, perillene-, dioxazine-, and quinacridone-based additives.

Further the additive may be a solid foaming agent. Any solid foaming agent can be used as long as they are insoluble in hydrocarbon solvents such as aliphatic hydrocarbons, alicyclic hydrocarbons, and aromatic hydrocarbons. Representative examples of such solid foaming agents include azo compounds such as azodicarbonamide and azobisisobutyronitrile, nitroso compounds such as dinitrosopentamethylenetetramide, and sulfonylhydrazide compounds such as p-toluenesulfonylhydrazide and p,p'-oxybis-(benzenesulfonylhydrazide).

To improve the control of the polymerization reaction, including the stereocontrol, if applicable, Lewis base additives (e.g. ethyl benzoate, silanes, etc.) may be added to the polymerization reaction.

Plasticizers or dispersants are additives that increase the plasticity or fluidity of a material. Therefore, a plasticizer may be added to the polymerizing step in the present method to alter the properties of the produced nanocomposite. Plasticizers work mainly by embedding themselves between the chains of polymers, spacing them apart and increasing the free volume of the plastic, and thus significantly lowering the glass transition temperature for the plastic and making it softer. Plasticizers can be grouped into several common categories including phthalates, trimellitates, adipates, sebacates, maleates, benzoates, terephthalates, sulfonamides, organophospahtes, and polyethers. Exemplary plasticizers include, but are not limited to bis(2-ethylhexyl) phthalate (DEHP), diisononyl phthalate (DINP), di-n-butyl phthalate (DnBP, DBP), butyl benzyl phthalate (BBzP), diisodecyl phthalate (DIDP), dioctyl phthalate, o-nitrophenyloctylether, trimethyl trimellitate (TMTM), tri-(2-ethylhexyl) trimellitate (TEHTM-MG), tri-(n-octyl,n-decyl) trimellitate (ATM), tri-(heptyl,nonyl) trimellitate (LTM), n-octyl trimellitate (OTM), bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), dioctyl terephthalate, 1,2-cyclohexane dicarboxylic acid diisononyl ester, alkyl sulphonic acid phenyl ester (ASE), N-ethyl toluene sulfonamide (o/p ETSA), N-(2-hydroxypropyl) benzene sulfonamide (HP BSA), N-(n-butyl) benzene sulfonamide (BBSA-NBBS), tricresyl phosphate (TCP), tributyl phosphate (TBP), and triethylene glycol dihexanoate.

Further, the nanocomposite may be additionally altered after formation to instill any desired polymer properties. The additional alterations may comprise any post polymerization technique that modifies polymeric properties, such as vulcanization, grafting, and/or cross-linking. Further polymer processing techniques, such as blow molding, thermoforming, coating, extrusion, injection molding, fiber spinning, filament winding, pultrusion, and the like are considered to be within the scope of the present method.

In one embodiment, the preparation of the catalyst composition includes (i) first mixing the metallocene catalyst and the alkylaluminoxane co-catalyst with the ethylene, (ii) then adding the $BaFe_{12}O_{19}$ nanoparticles to the mixture.

In one embodiment, the nanofiller is not pre-reacted or pre-mixed with the catalyst, the co-catalyst, or the catalyst composition. Rather, the un-treated nanofiller is added to the polymerization reaction as a reaction component. In a preferred embodiment, the nanofiller is the last component added to the polymerization reaction.

In one embodiment, the reaction medium is fully saturated with ethylene gas. The reaction medium may also be partially saturated by ethylene gas.

In one embodiment, a weight ratio of $BaFe_{12}O_{19}$ nanoparticles to the zirconocene catalyst is 0.5:1 to 1:1, and the catalyst composition has a catalyst activity of $300\text{-}350\times10^{-3}$, preferably $320\text{-}348\times10^{-3}$, more preferably $340\text{-}347\times10^{-3}$ KgPE·mol$^{-1}$·h$^{-1}$·bar$^{-1}$.

In one embodiment, a weight ratio of $BaFe_{12}O_{19}$ nanoparticles to the zirconocene catalyst is 1.5:1 to 2:1, and the catalyst composition has a catalyst activity of $350\text{-}370\times10^{-3}$, preferably $352\text{-}365\times10^{-3}$, more preferably $353\text{-}360\times10^{-3}$ KgPE·mol$^{-1}$·h$^{-1}$·bar$^{-1}$.

In one embodiment, a weight ratio of $BaFe_{12}O_{19}$ nanoparticles to the zirconocene catalyst is 2.5:1 to 3:1, and the catalyst composition has a catalyst activity of $280\text{-}300\times10^{-3}$, preferably $285\text{-}295\times10^{-3}$, more preferably $288\text{-}293\times10^{-3}$ KgPE·mol$^{-1}$·h$^{-1}$·bar$^{-1}$.

In one embodiment, a weight ratio of $BaFe_{12}O_{19}$ nanoparticles to the zirconocene catalyst is 0.5:1 to 1:1, and the catalyst composition has an increased catalyst activity of 25-35, preferably 27-34, more preferably 29-32%, relative to a catalyst composition that is substantially the same except for the absence of the $BaFe_{12}O_{19}$ nanoparticles.

In one embodiment, a weight ratio of $BaFe_{12}O_{19}$ nanoparticles to the zirconocene catalyst is 1.5:1 to 2:1, and the catalyst composition has an increased catalyst activity of 30-38, preferably 31-37, more preferably 32-35%, relative to a catalyst composition that is substantially the same except for the absence of the $BaFe_{12}O_{19}$ nanoparticles.

In one embodiment, a weight ratio of $BaFe_{12}O_{19}$ nanoparticles to the zirconocene catalyst is 2.5:1 to 3:1, and the catalyst composition has an increased catalyst activity of 5-15, preferably 7-13, more preferably 9-11%, relative to a catalyst composition that is substantially the same except for the absence of the $BaFe_{12}O_{19}$ nanoparticles.

In one embodiment, the nanocomposite comprises 0.01-1.0, preferably 0.1-0.8, more preferably 0.12-0.6 wt % of the $BaFe_{12}O_{19}$ nanoparticles.

In one embodiment, the polymerizing forms a nanocomposite in which the $BaFe_{12}O_{19}$ nanoparticles are evenly dispersed in the matrix of polyethylene.

Due to the enhancement effect of the inorganic nanometer particles (i.e. $BaFe_{12}O_{19}$), the mechanical properties of the polyolefin materials thus obtained will be greatly increased even if the content of the inorganic component is extremely low.

The crystalline melting temperature ($T_m$) is the reversible transition in crystalline materials from a hard and relatively brittle state into a molten or rubber-like state. At the melting point, the solid and liquid phase exist in equilibrium. Hence the process of crystal formation is spontaneous below the $T_m$ equilibrium point, while the reverse process, i.e. crystal melting to form a liquid or rubber-like state is spontaneous above this crystalline melting temperature.

In one embodiment, the nanocomposite has a crystalline melting temperature of 133.3-134.0, preferably 133.5-133.95, more preferably 133.7-133.9° C.

In one embodiment, the nanocomposite has a % crystallinity of 63-73, 65-71, 66-70%.

The examples below are intended to further illustrate the in-situ polymerization methods, and the protocols for preparing and characterizing the resulting nanocomposites, and are not intended to limit the scope of the claims.

Example 1

Materials

All manipulations were carried out under $N_2$ environment, with standard Schlenk flask and glove box. Zirconocene (catalyst), Toluene (solvent) and methylaluminoxane (MAO) co-catalyst were obtained from Sigma-Aldrich Chemicals and kept in glove box (nitrogen environment) to prevent any contamination. Barium ferrite ($BaFe_{12}O_{19}$) less than 100 nm was also purchased from Sigma Aldrich.

Example 2

Synthesis of Nanocomposites

The nanocomposites were synthesized by in-situ polymerization of ethylene in the presence of barium ferrite. The catalyst used for polymerization was zirconocene ($CpZrCl_2$), along with MAO as co-catalyst and Toluene as solvent. Prior to reaction a specified amount of catalyst and solvent were added to the Schlenk flask inside a glove box. After this, the reactor temperature was equilibrated in a constant temperature bath. The nitrogen gas was then removed from the reactor by a vacuum pump, followed by pressurizing with gaseous ethylene. The co-catalyst was introduced with the help of syringe after saturation of ethylene. A suspension of barium ferrite nanoparticles and toluene was introduced with the help of syringe directly after adding MAO.

The reaction was allowed to proceed for 30 minutes at a stirring speed of 1000 rpm. The polymerization reaction was then quenched by adding acidified methanol (5 vol. % HCl). The product was filtered and washed with excess amount of methanol and then kept in an oven at 50° C. All the samples were prepared by the same conditions.

Example 3

Results and Discussion

FIG. 1 shows the activity of the catalyst at different loadings of the nanofiller (Barium-ferrite). It is clear that there is an increase in the activity of the catalyst. Maximum activity is obtained at filler loadings of 10 mg of nanofiller. Further increases in the amount of the nanofiller have a detrimental effect on the activity of the catalyst. The summarized data is presented in Table 1.

TABLE 1

Activity of catalyst at various polymerization conditions

| No. | Filler (mg)[a] | Time (mins) | Product (g) | Activity [b] |
|---|---|---|---|---|
| 1 | 0 | 30 | 2.632 | 264.6 |
| 2 | 5 | 30 | 3.44 | 346.03 |
| 3 | 10 | 30 | 3.53 | 354.38 |
| 4 | 15 | 30 | 2.90 | 291.04 |

[a]Barium ferrite ($BaFe_{12}O_{19}$), 5 mL MAO and 6 mg zirconocene
[b] $\times 10^{-3}$ KgPE/mol h bar

Example 4

Characterization of the Nanocomposites

Figure 2:
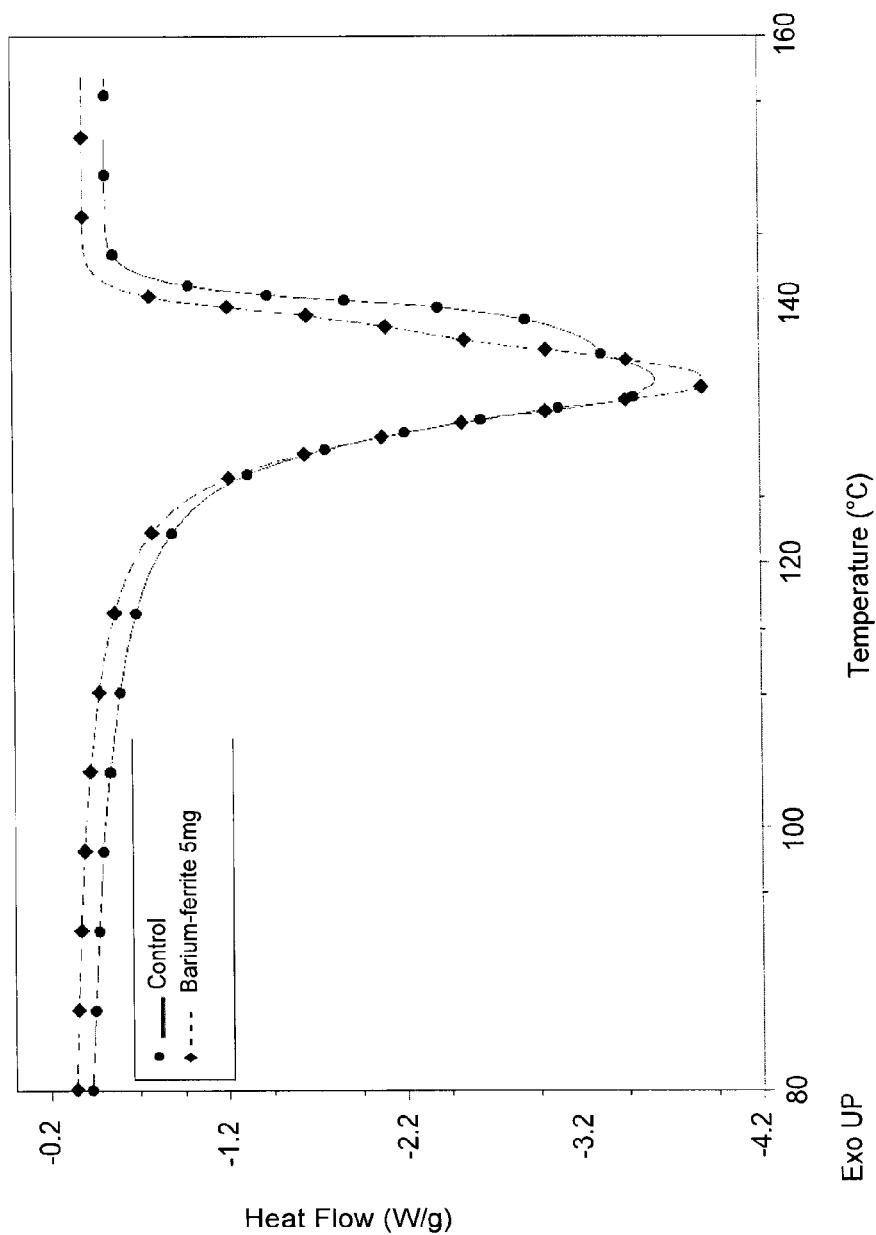
FIG. 2 is a graph illustrating the differential scanning calorimetry (DSC) endotherms, across a temperature range, of HDPE (control) and the HDPE/$BaFe_{12}O_{19}$ nanocomposite obtained from polymerization with 5 mg barium ferrite nanofiller.

The synthesized nanocomposites were characterized by differential scanning calorimetry (DSC) for any changes in thermal characteristics. The results are summarized in Table 2. As can be seen in the data, no significant changes in the crystalline melting temperature ($T_m$) and percent crystallinity are observed. The slight reduction in the crystallinity can be due to the hindrance of chain movements due to the nanofiller. Thus the barium-ferrite nanoparticles enhanced the activity of the catalyst without compromising the intrinsic thermal characteristics of HDPE. The DSC endotherms of HDPE and HDPE/Barium-ferrite nanocomposites are shown in FIG. 2.

TABLE 2

Summarized DSC results for HDPE and HDPE/barium-ferrite nanocomposites

| No. | Filler (mg) | $T_m$ | % Crystallinity |
|---|---|---|---|
| 1 | 0 | 133.27 | 74.08 |
| 4 | 5 | 133.87 | 68.22 |

The invention claimed is:

1. A method, comprising:
polymerizing ethylene in the presence of a catalyst composition comprising $BaFe_{12}O_{19}$ nanoparticles, a zirconocene catalyst, and an alkylaluminoxane co-catalyst, wherein the $BaFe_{12}O_{19}$ nanoparticles are not pre-reacted or pre-mixed with the zirconocene catalyst or the alkylaluminoxane co-catalyst and wherein a weight ratio of the $BaFe_{12}O_{19}$ nanoparticles to the zirconocene catalyst is 0.5:1 to 3:1;
wherein the polymerizing forms a nanocomposite in which the $BaFe_{12}O_{19}$ nanoparticles are dispersed in a matrix of polyethylene (PE).

2. The method of claim 1, wherein the zirconocene catalyst is zirconocene dichloride.

3. The method of claim 1, wherein the polymerizing is carried out in a liquid solvent.

4. The method of claim 3, wherein the liquid solvent is a hydrocarbon solvent.

5. The method of claim 1, wherein the alkylaluminoxane co-catalyst is methylaluminoxane.

6. The method of claim 1, wherein the $BaFe_{12}O_{19}$ nanoparticles have a largest diameter of 1-100 nm.

7. The method of claim 1, wherein the polymerizing includes first mixing the zirconocene catalyst and the alkylaluminoxane co-catalyst with the ethylene to form a mixture, then adding the $BaFe_{12}O_{19}$ nanoparticles to the mixture.

8. The method of claim 1, wherein a weight ratio of $BaFe_{12}O_{19}$ nanoparticles to the zirconocene catalyst is 0.5:1 to 1:1, and the catalyst composition has a catalyst activity of $300\text{-}350\times10^{-3}$ kgPE·mol$^{-1}$·h$^{-1}$·bar$^{-1}$.

9. The method of claim 1, wherein a weight ratio of $BaFe_{12}O_{19}$ nanoparticles to the zirconocene catalyst is 1.5:1 to 2:1, and the catalyst composition has a catalyst activity of $350\text{-}370\times10^{-3}$ kgPE·mol$^{-1}$·h$^{-1}$·bar$^{-1}$.

10. The method of claim 1, wherein a weight ratio of $BaFe_{12}O_{19}$ nanoparticles to the zirconocene catalyst is 2.5:1 to 3:1, and the catalyst composition has a catalyst activity of $280\text{-}300\times10^{-3}$ kgPE·mol$^{-1}$·h$^{-1}$·bar$^{-1}$.

11. The method of claim 1, wherein the nanocomposite comprises 0.01-1.0 wt % of the $BaFe_{12}O_{19}$ nanoparticles.

12. The method of claim 1, wherein the nanocomposite has a crystalline melting temperature of 133.3-134.0° C.

13. The method of claim 1, wherein the nanocomposite has a % crystallinity of 63-73.

* * * * *